Patented Aug. 12, 1947

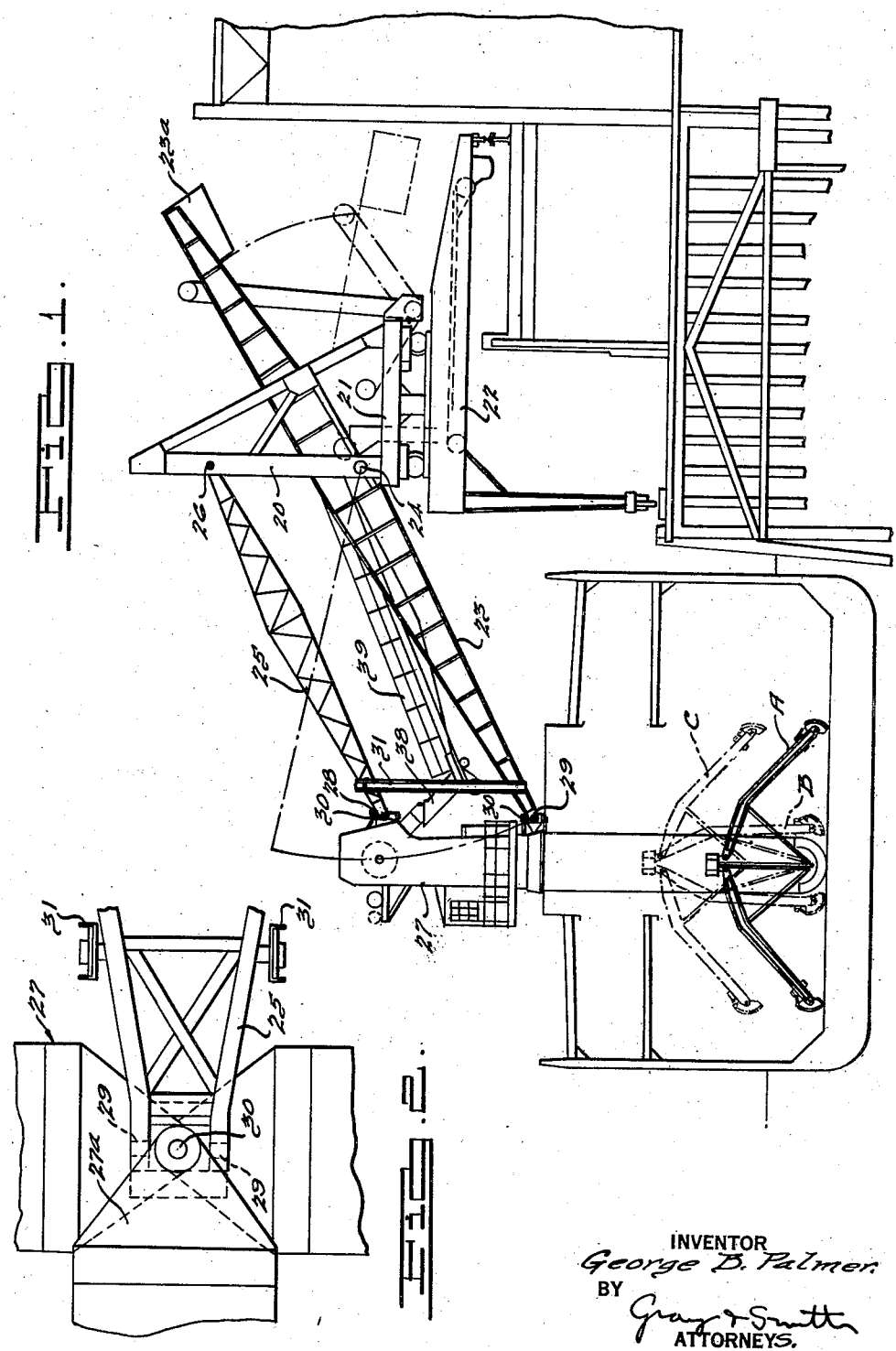

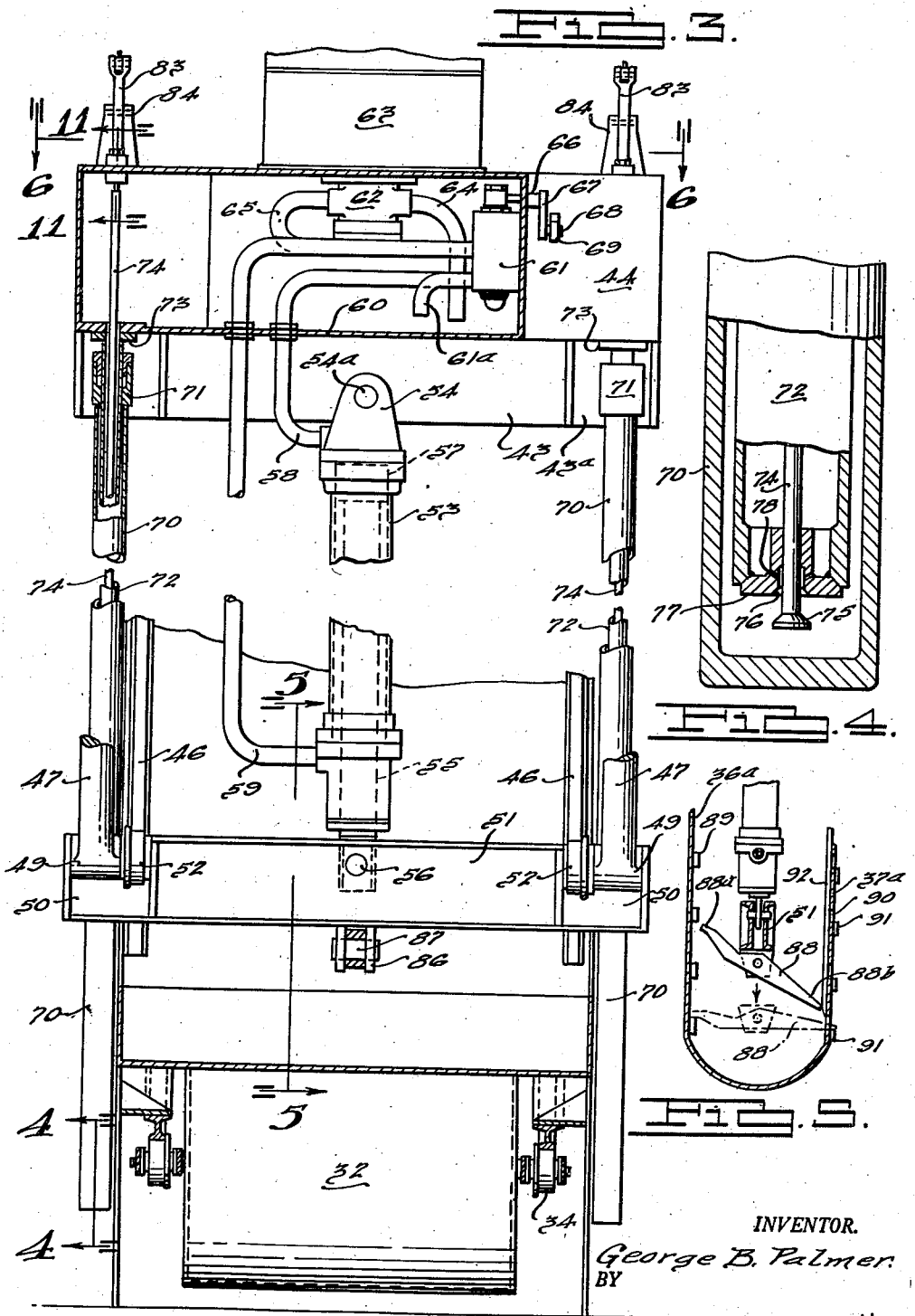

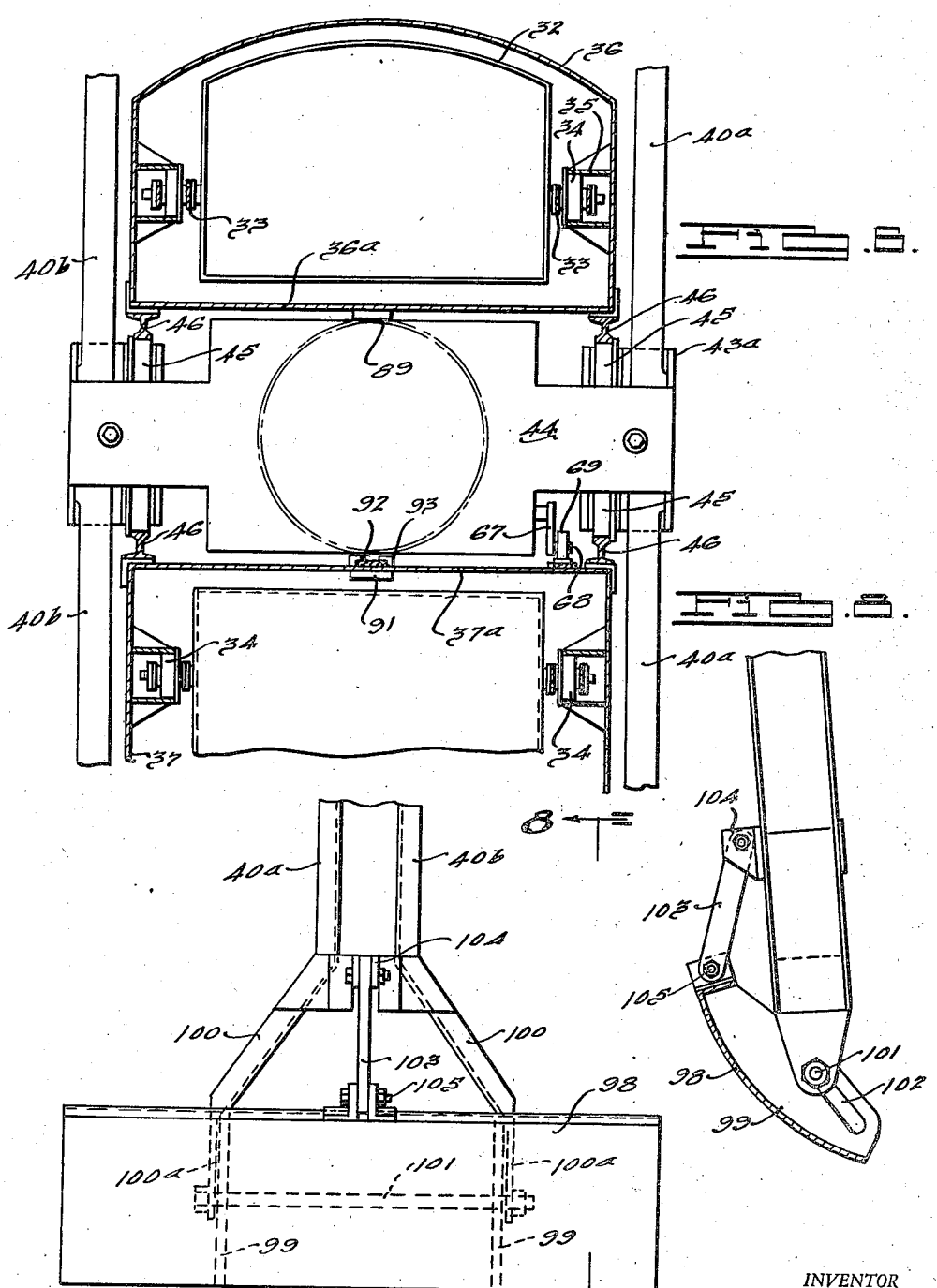

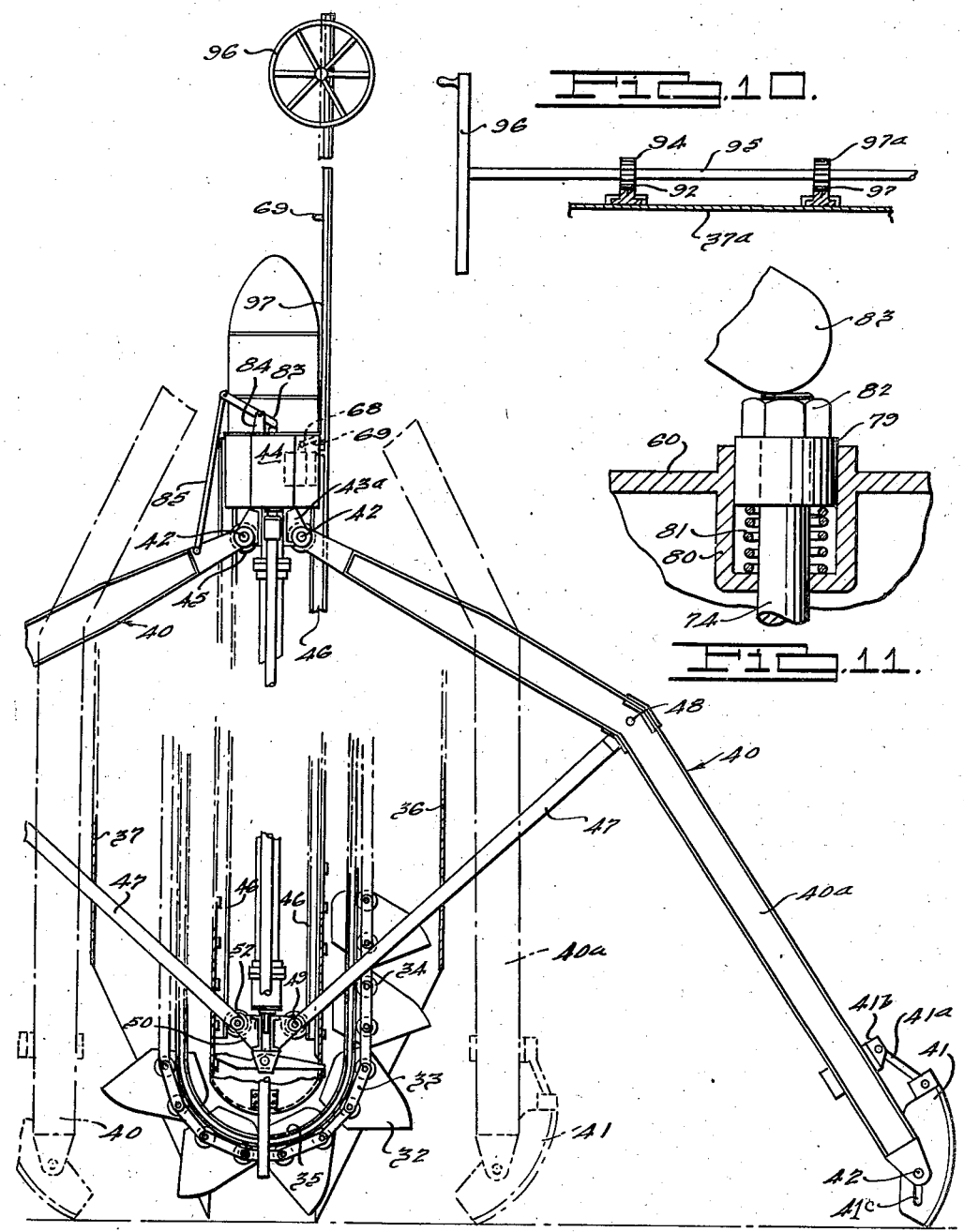

2,425,342

UNITED STATES PATENT OFFICE 2,425,342

MATERIAL HANDLING APPARATUS

George B. Palmer, Grosse Ile, Mich.

Application December 6, 1944, Serial No. 566,858

34 Claims. (Cl. 214—115)

This invention relates to apparatus for handling bulk materials, such as ore, bauxite, sand, crushed stone, gravel, copra, coal, grain, salt, raw sugar and the like, and especially to an improved apparatus particularly adapted for removing, unloading or discharging bulk materials from various sources such as bins, pits, containers, cargo holds of barges and ships, railway cars and stock piles.

Although the present apparatus is especially useful for moving bulk materials by scraper devices from a pile to a given locality and thence conveying the materials by bucket elevator to an elevated point whence the material is conveyed to destination, it will be understood that the scraper devices and associated mechanism may be utilized to move the material to a horizontally movable conveyor located beneath the level of the pile of material and fed through a hatch opening or the like.

In handling materials of the above character it has been common to employ elevators of the bucket type suitably supported and adapted to be lowered into a material holding bin or pit, and be moved therein in order to remove all the material contained in such bin or pit. It has been found in the process of unloading such materials that the material ceases to flow after the angle of repose is reached and that the elevator or conveyor buckets or flights will only partially fill unless they are surcharged to some distance above the top of said buckets or flights. This has usually in past practice necessitated moving the material from the pile by hand shovelling towards the receiving end of the elevator or conveyor, resulting in hazards to the workmen as well as involving considerable labor expense. Numerous attempts have been made by others to provide mechanical means for moving or drawing the material toward the receiving end of the elevator or conveyor so as to increase the area served thereby. These have, so far as I am aware, been proved impractical or inefficient and have had many disadvantages. In one such type of construction proposed for the purpose of discharging grain four scrapers are used, each of them requiring a special attendant for drawing it back from the elevator and guiding it. The fifth man is required at the elevator control to operate the winch for hauling the scrapers. Because of the difficulty of working amongst the cargo the scraper attendants have to be frequently relieved and, therefore, nine men working in relays are usually required to operate one elevator at the rate of only about thirty percent of its full discharge capacity.

In my Patent No. 2,110,737, granted March 8, 1938, there is disclosed a material handling apparatus which in actual tests has proved highly efficient and practical in mechanically unloading or discharging material at a rate ensuring continuous operation of the elevator or conveyor at substantially its full rated capacity. This apparatus overcame many disadvantages and difficulties encountered in standard practice and enabled large savings in unloading costs to be gained.

An object of the present invention is to improve on the apparatus disclosed in my said prior patent and to provide a mechanism which will be even more efficient in operation, compact and relatively simple in construction, and capable of extensive application or adaptability to the unloading of bulk materials in many fields and under a wide range of conditions.

A further object of the present invention is to provide a novel and improved material handling and discharging apparatus having a material raising elevator or conveyor or other means of raising or moving material in which means are provided for drawing the material toward the receiving end of the elevator or conveyor or the like, said apparatus being capable of operation from a point remote from the receiving or loading end of the elevator and preferably by a single operator.

Another object of the invention is to provide a material handling device of the foregoing character having improved means for drawing the material toward the receiving end of the elevator or conveyor at a rate ensuring continuous operation of the elevator or conveyor at substantially its full discharge capacity.

A still further object of the invention is to provide a novel improved material handling and discharging apparatus operable from a single post located outside of the material hold, thus eliminating the necessity of having men working amongst the bulk of the material handled.

A further object of the invention is to provide an improved material handling apparatus provided with hydraulically operated and controlled scrapers adapted to deliver the material to a predetermined locality served by the scrapers whence the material may be conveyed away to a desired destination, the improved construction being highly efficient in operation, relatively simple in construction, and easy to operate and maintain in operative condition.

Other objects of this invention will appear in the following description and appended claims, reference being had to the accompanying drawings forming a part of this specification wherein like reference characters designate corresponding parts in the several views.

Fig. 1 is a side elevation, in part diagrammatical, of a material handling apparatus constructed in accordance with one embodiment of the present invention utilizing an elevator conveyor which in this view is shown lowered into the cargo hold of a vessel.

Fig. 2 is an enlarged fragmentary plan view illustrating the pivotal connection between one of the booms and the super-structure of the elevator.

Fig. 3 is an enlarged fragmentary front elevation, partly in section, illustrating particularly the hydraulic mechanism for operating the scraper jaws.

Fig. 4 is an enlarged section taken substantially through lines 4—4 of Fig. 3 looking in the direction of the arrows.

Fig. 5 is a section on a reduced scale taken substantially through lines 5—5 of Fig. 3 looking in the direction of the arrows.

Fig. 6 is a fragmentary horizontal section taken substantially through lines 6—6 of Fig. 3 looking in the direction of the arrows.

Fig. 7 is a fragmentary rear end elevation showing one embodiment of scraper jaw.

Fig. 8 is a section taken substantially through lines 8—8 of Fig. 7 looking in the direction of the arrows.

Fig. 9 is a fragmentary side elevation, partly in section, illustrating the lower portion of the elevator conveyor and the manner of operation of the scrapers.

Fig. 10 is a view showing the manner in which the gag bar is operated.

Fig. 11 is an enlarged section taken substantially through lines 11—11 of Fig. 3 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the present invention as applied to an apparatus designed and constructed for the purpose of unloading bulk material from the cargo hold of a vessel. The apparatus, as illustrated in Fig. 1, comprises a vessel unloading derrick provided with a vertically extending mast 20 supported on a turntable 21 carried by a platform 22 supported for travel on an unloading dock. A main gaff or boom 23 is hinged at 24 to the lower end of the mast 20 for vertical swinging movement, the boom extending rearwardly beyond the mast and carrying at its rear end a counterweight 23a. The boom may be swung about its hinge connection 24 and the turntable 21 may be operated to swing the boom laterally by a gun tackle, as shown, or by other suitable mechanism well known in the art.

Hinged at 26 to the upper end of the mast 20 is a guide boom or gaff 25 extending generally in parallelism with the main boom 23. A material raising elevator, generally indicated at 27, is suspended from the outer ends of the booms 23 and 25. The main boom 23 is hinged at 29 on a horizontal axis to the lower part of the super-structure of the elevator, and the guide boom 25 is correspondingly hinged at 28 on a horizontal axis to the upper part of the super-structure. The hinge connections 28 and 29 are carried by suitable brackets 27a rigidly secured to the super-structure of the elevator, and as illustrated in Fig. 2 these connections include vertically alined pivots 30 permitting the elevator to swivel horizontally relatively to the booms 23 and 25 about a vertical axis extending through the pivots 30. The outer ends of the booms are pivotally connected together through the medium of vertical tie beams 31. It will thus be seen from the foregoing construction that the booms 23 and 25 may be swung vertically to lower and raise the elevator 27 through the hatch opening into and out of the hold of the vessel. Furthermore, it will be seen that the elevator may be swung laterally through a large arc, thereby enabling the scraper devices to be swung laterally about the vertical axis of the elevator so as to operate over a wider area in the hold.

The material raising elevator 27, suspended from the booms 23 and 25, is of the conventional bucket type comprising a succession of buckets 32 carried by endless chains 33 which in turn carry flanged guide rollers 34, see Fig. 6, travelling on spaced tracks or rails 35 secured to the inner side walls of vertically extending housings 36 and 37. These housings provide portions of the supporting framework of the elevator and are spaced apart, as shown in Figs. 6 and 9, with the lower ends thereof open at the boot of the elevator to permit the bucket and chain mechanism to travel downwardly through the open end of one housing and thence upwardly through the adjacent housing. At the upper end of the elevator the buckets 32 discharge their contents into a chute 38 which in turn feeds the material to a conveyor 39 to be conveyed to the desired destination.

The mechanism for drawing or feeding the material to the receiving end of the conveyor, which in the present instance is the boot of the elevator 27, comprises a pair of scraper carrying members or arms 40 to the outer end of each of which is pivotally mounted a scraper 41. Each arm 40 is bent intermediate its ends to provide angularly related portions, and as shown in Fig. 6 each arm comprises spaced parallel bars 40a and 40b rigidly connected together. In the construction illustrated in Fig. 9 each scraper 41 is of hollow scoop type extending between the spaced ends of the bars 40a and 40b and hingedly connected thereto through the medium of a transverse rod 42 extending through vertical slots 41c in the opposite side walls of the scraper. Pivoted to the upper end of the heel of the scraper is a link 41a which has its upper end pivoted to a bracket 41b fastened to the scraper arm. This improved articulated mounting of the scraper 41 on the scraper arm not only permits the scraper to assume its most effective position during a scraping operation but also enables the scraper to rise and descend to a limited extent as determined by the length of the slot 41c so as to accommodate the arc of travel of the scraper arm and also irregularities or unevenness of the floor.

The side bars 40a and 40b of each scraper arm 40 are spaced apart at their upper ends to embrace both sides of the elevator housing 36 or 37, as shown in Fig. 6, and are pivotally connected through the medium of transverse alined hinge pins 42 to spaced brackets 43a secured to a crosshead 43 rigidly secured to the bottom of a casing 44. The hinge pins 42 carry flanged guide rollers 45 adapted to travel along vertically extending rails 46 secured by means of angle brackets to the inner corners of the housings 36 and 37 of the elevator, as shown in Fig. 6. Thus, the upper ends of the scraper arms are hingedly mounted through brackets 43a on the crosshead 43 to swing vertically about horizontal axes, and these ends of the arms are positioned with respect to each other and are guided for vertical travel relatively to the bucket housings 36, 37 through the medium of the spaced pairs of flanged guide rollers 45 which travel on the spaced pairs of guide rails 46 carried by the housings.

A pair of spaced parallel control links 47 are pivoted at 48 at their outer ends to each scraper arm 40 at the bend or juncture between the angularly related portions of the arm. The control links for each scraper arm embrace opposite sides of the elevator housing, as shown in Figs. 3 and 9, and the lower end of each link is pivoted at 49 to an angle bracket 50 rigidly secured to a cross-head 51. This cross-head is similar in construction to the upper cross-head 43 and comprises a pair of parallel channels rigidly connected together in spaced relation and to the ends of which the brackets 50 are secured. Mounted on the hinge pin at the inner end of each link 47 is a flanged guide roller 52 engaging and travelling on one of the guide rails 46. From the foregoing construction it will be seen that each scraper arm 40 is controlled by a pair of parallel links 47 pivoted in common at their outer ends at 48 to the associated scraper arm and pivotally connected at their inner ends at 49 on a common transverse axis to the cross-head 51 which is guided for vertical travel on the four rails 46 through the medium of two pairs of guide rollers 52 mounted on the hinge axes of the control links.

Hydraulic mechanism is interposed between the upper and lower cross-heads 43 and 51 for connecting them together and operative to shift one cross-head in a vertical direction relative to the other and vice versa. The hydraulic mechanism includes a vertically extending hydraulic cylinder 53 secured at its upper end to a bracket 54 extending between the channel members of the cross-head 43 and connected thereto at 54a. A piston rod 55 is mounted centrally within the cylinder 53 and has its lower end projecting through an opening in the lower end of the cylinder and connected at 56 to the cross-head 51. The piston rod has a sliding fit within the opening in the cylinder which is sealed against the leakage of oil by means of a suitable packing gland. Secured to the upper end of the piston rod is a piston 57 having a sliding fit within the cylinder 53. Oil may be introduced under pressure into or exhausted from a chamber at the upper end of the cylinder above the piston 57 through the medium of a conduit 58. Oil may be introduced into or exhausted from a chamber at the lower end of the cylinder 53 below the piston 57 through the medium of a conduit or pipe 59. The pipes 58 and 59 extend through the bottom wall of a tank 60 and lead to a four-way valve 61 mounted on the inside of the tank. Also mounted within the tank 60 is a hydraulic pump 62 driven by an electric motor 63 mounted on the top of the tank. The tank 60 is adapted to contain a body of oil or other hydraulic medium and is sealed against the leakage of oil therefrom. The pump 62 is provided with an intake pipe 64 through which oil is drawn during operation from the body of oil within the tank or reservoir. The outlet pipe 65 from the pump leads to the four-way valve 61 which may be of any conventional type operable to direct the oil under pressure from the pump either through conduit 58 or conduit 59. When oil is fed under pressure through one of these conduits to one end of the cylinder, it will be exhausted through the other conduit from the opposite end of the cylinder to the valve 61 and thence returned to the reservoir through a return pipe 61a.

In the present instance the four-way valve 61 is of conventional type having suitable ports controlled by a slidable control valve which may be shifted, in order to direct the oil through either pipe 58 or pipe 59, by means of a shaft 66 extending through the wall of the tank and carrying a crank arm 67 on its outer end to which is secured a projecting pin 68.

Adjustably mounted at vertically spaced points on the inner wall 37a of the elevator housing 37, as later described, are upper and lower stops of abutments 69 in position to be engaged by the pin 68 at the upper and lower limits of the travel of the upper inner ends of the scraper arms 40. Contact of the pin 68 with either stop 69 at the limit of travel of the upper ends of the scraper arms will result in swinging the crank arm 67 and shifting the control member of the four-way valve 61 so as to reverse the flow of oil through the conduits 58 and 59.

When oil is pumped through conduit 58 into the upper end of the cylinder above piston 57 the cross-head 43 is elevated while the cross-head 51 remains stationary. At the upper limit of its travel pin 68 engages the upper stop 69 thereby reversing the valve to direct the oil through conduit 59 into the lower end of the cylinder below the piston 57. This elevates the lower cross-head to a point reached when the piston comes to the end of its stroke at the upper end of the cylinder. Thereupon the two cross-heads are allowed to descend together and upon reaching their respective lower limits the pin 68 contacts the lower stop 69 thus actuating the valve 61 and again directing the oil through conduit 58 for the commencement of a succeeding operation.

The hydraulic mechanism thus described, which forms the connection between the cross-heads 43 and 51, is operable automatically to impart relative vertical travel to these cross-heads thereby transmitting corresponding vertical travel to the upper ends of the scraper arms and to the lower ends of the control links 47, and as a consequence moving the scrapers outwardly and inwardly in predetermined paths through successive cycles of operation. With the scraper arms positioned as shown in full lines at A in Fig. 1 the upper ends of these arms are shifted vertically through the medium of the cross-head 43, thereby drawing the scraper jaws inwardly to the boot or receiving point of the elevator, as shown at B in dotted lines in Fig. 1. During this movement the lower ends of the control links 47 remain stationary while the upper ends swing inwardly toward the elevator. From the position B in Fig. 1 the scraper arms are swung outwardly and upwardly by imparting upward travel to the lower cross-head 51 while holding the upper cross-head 43 stationary. This upward travel of the lower cross-head causes the control links 47 to shift the scraper arms to the position shown at C in Fig. 1. Thereupon the entire mechanism, including the upper and lower cross-heads and the scraper arms, is caused to descend so as to position the scraper arms in the manner shown at A in Fig. 1 for a succeeding charging operation.

In accordance with the present invention brake means is provided for maintaining the upper cross-head 43 in fixed position at its upper limit during the upward travel of the lower crosshead 51 and also for controlling the rate of downward travel of the cross-heads when the scraper arms descend from position C to position A in Fig. 1. In the present embodiment this brake mechanism is hydraulically actuated and is controlled automatically by the angular positions of the scraper arms 40. A pair of hydraulic brake devices are provided at opposite sides of the housing 37 each being similar in construction and controlled by a side bar 40a, 40b of the adjacent scraper arm 40 and, hence, a description of one will suffice for both. Rigidly secured to the housing 37 at each side thereof is a vertically extending cylinder 70 closed at its lower end and terminating at its upper end in a fixed head 71 provided with a packing gland through which extends a cylindrical ram 72 rigidly secured at its upper end at 73 to the bottom of the casing or tank 60 and communicating through an opening with the interior of the tank. The ram cylinder 72 has a sliding fit in the head 71 and the upper end of the cylinder 70 is sealed against the leakage of oil past the ram by virtue of the packing gland carried by the head 71. Extending centrally through the ram cylinder 72 is a valve rod 74 terminating at its lower end in a pilot or bleeder valve 75, see Fig. 4, engageable with a tapered valve seat 76 at the lower end of a passage in a check valve 77, this check valve having bleeder ducts 78 communicating with the passage controlled by the pilot valve 75. The valve rod 74 extends freely through the upper end of the ram cylinder 72 and thence through the tank 60 as shown in Fig. 3. As shown in Fig. 11 the upper end of the valve rod carries a cylindrical head or piston 79 slidable within a cylinder 80 formed in the top wall of the tank 60. Interposed between the head 79 and the bottom of the cylinder 80 is a compression spring 81 which functions to urge the valve rod 74 upwardly into position to cause the pilot valve 75 to engage the seat 76 and close off the passage from the interior of the ram cylinder 72 into the main cylinder 70. The head or piston 79 is clamped against a shoulder on the upper end of the valve rod 74 by means of a nut 82 threaded onto the end of the rod which, as shown in Figs. 9 and 11, is in position to be engaged by the end of a valve lever 83 fulcrumed intermediate its ends on a bracket 84 mounted on the top of the tank 60. Pivotally connected to the opposite or outer end of the lever 83 is a shiftable link 85 the lower end of which is pivoted to the scraper arm 40 at a point adjacent the upper end thereof as shown in Fig. 9.

It will be apparent from the foregoing construction that the angular position of the valve lever 83 is determined by the angular position of the scraper arm 40. When the scraper arm is swung outwardly and upwardly to either of the positions shown at A and C in Fig. 1 and also the position shown in full lines in Fig. 9, the link 85 is shifted upwardly to swing the lever 83 and cause the inner end thereof to engage the upper end of the valve rod 74 and shift it downwardly against the action of spring 81 to the position shown in Fig. 4, thereby establishing communication between the ram cylinder 72 and the main cylinder 70 through the medium of the bleeder passages 78. When, however, the scraper arms 40 are swung inwardly toward the elevator to the positions shown at B in Fig. 1 and also in dotted lines in Fig. 9, the link 85 is drawn downwardly, thereby swinging the lever 83 away from the valve rod 74 and permitting the spring 81 to raise the valve rod and move the pilot valve 75 to closed position.

In operation it will be seen that when the scraper arms are swung inwardly toward the elevator by shifting the cross-head 43 upwardly the ram cylinder 72 will travel upwardly within the main cylinder 70. During this operation the link 85 will be shifted downwardly, due to the change in the angular position of the scraper arm, permitting the pilot valve 75 to close. However, the suction created within the cylinder 70 by the upward travel of the ram will open the check valve 77 against the action of the spring 81 permitting oil to flow from the ram cylinder into the main cylinder 70. When the cross-head 43 reaches its upper limit of travel with the scraper arms in the dotted line position of Fig. 9 and in position B in Fig. 1, the ram 43 will be held against downward movement by the body of oil within the cylinder 70 acting against the lower end of the ram and holding the check valve tightly closed. With both valves closed at this time it is impossible for the ram 72 to move downwardly within the cylinder 70 and, hence, the upper cross-head 43 and the scraper arms supported thereby are maintained at their upper limit while the scraper arms are shifted from position B to position C in Fig. 1. At substantially the moment the scraper arms reach position C the control lever 83 contacts the valve rod 74 and depresses it thus opening the pilot or bleeder valve 75 to the position shown in Fig. 4. As soon as this valve is opened the cross-heads 43 and 51 together with the scraper arms are allowed to descend gradually at the desired rate of travel from the position C in Fig. 1 to the position A in Fig. 1, since oil at this time is allowed to bleed slowly from cylinder 70 into the ram through the bleeder passages 78. The rate of descent of the scraper arms will be governed by the size of the passages 78 which control the rate of flow of oil from the cylinder 70 into the ram cylinder permitting it to descend to the bottom of the main cylinder to the position shown in Fig. 4.

In accordance with the present invention provision is made for obtaining the most efficient operation of the scrapers by controlling and varying their operative height with respect to the boot or receiving end of the elevator. To maintain maximum capacity and uniform flow to the elevator buckets, it is frequently necessary to commence operation of the scrapers at a level some distance above the bottom of the elevator. In other words, even though the elevator boot is lowered into the pile of material it may be desirable to commence operation of the scrapers on the top of the pile at a level above the boot of the elevator and to gradually lower the scrapers step by step as the depth of the pile diminishes until the scrapers have reached the floor level as illustrated in Figs. 1 and 9. Accordingly, a feature of the present invention resides in the provision of means for controlling the vertical position of the cross-head 43 so that the scraper arms may operate in the manner shown in Fig. 1 at different levels with respect to the elevator.

Pivoted at 87 to a bracket 86 rigidly fastened to the bottom of the cross-head 51 is a latch bar or dog 88 extending transversely between the inner walls 36a and 37a of the housings 36 and 37, see Figs. 3 and 5. On the inside of the wall 36a are rigidly secured at spaced points a series of stop blocks 89 in position to be engaged by one end 88a of the latch bar. The opposite wall 37a is provided with a series of slots or apertures 90 corresponding in number to the stop blocks 89 and located opposite thereto. On the inner side of the wall 37a are secured a number of stop blocks 91 arranged with their upper edges in line with the lower edges of the slots 90 and against which the end 88b of the latch bar rests when the end of this bar projects through any of the slots 90, as shown in dotted lines in Fig. 5. Extending vertically along the outer side of the wall 37a and guided thereon for slidable movement in a vertical direction is a gag bar 92. This bar is held in position in line with the slots 90 by suitable guides such as shown at 93 in Figs. 6 and 10. The upper end of this bar is provided with rack teeth engaged by a pinion 94 on a shaft 95 mounted in suitable bearings and adapted to be manually rotated by a hand wheel 96 positioned for convenient operation by the operator on the platform at the upper end of the elevator super-structure. Rotation of the hand wheel will rotate the pinion 94 and shift the gag bar 92 vertically so as to cover or uncover any of the slots 90 as desired. When the gag bar is in the position shown in Fig. 5, all of the slots 90 except the lowermost slot are covered by the gag bar and, hence, the cross-head 51 may be shifted downwardly with the end 88b of the latch bar riding over the face of the gag bar until it passes below the end thereof and projects through the bottom slot 90 thus tilting the latch bar from the full line to the dotted line position of Fig. 5 and causing it to be supported in fixed position upon the lower stop blocks 89 and 91. It will be seen, therefore, that the position of the cross-head 51 at its lower limit may be adjusted vertically by adjusting the gag bar 92 so as to uncover any or all of the slots 90.

Since the hydraulic mechanism may be positioned, as above described, at different levels for imparting to the scraper arms the sequence of movements illustrated in Fig. 1 it is therefore important that the positions of the stops or contacts 69 be adjusted for proper operation of the control valve 61 at each level. This is accomplished by mounting the upper and lower stops 69 in fixed vertically spaced relation on a slide bar 97 guided similarly to the gag bar and parallel thereto. The upper end of slide bar 97 carries rack teeth engaged by a pinion 97a on shaft 95, see Figs. 9 and 10. Thus, since the bars 92 and 97 are correspondingly adjusted vertically in unison each change of level of the lower cross-head 51 will be accompanied by a corresponding change in the positions of the stops or contacts 69.

In Figs. 7 and 8 there is shown a somewhat modified form of scraper and mounting therefor, the operation thereof being the same as described in connection with scraper 41. The scraper 98 in these views is of hollow scoop type having vertically extending parallel internal webs 99. The spaced side bars 40a, 40b of the scraper arm are brought together closely near their lower ends and thence are formed with diverging portions 100 projecting into the scraper and terminating in parallel portions 100a embracing opposite sides of the webs 99. The portions 100a are connected by a transverse shaft or rod 101 extending through upwardly extending slots 102 in the webs 99. A control link 103 is pivotally connected at its upper end to a bracket 104 rigidly secured to the scraper arm. The lower end of the link is pivoted at 105 to the heel of the scraper. As in the previous embodiment the scraper 99 can rise and descend and also pivot slightly as it is drawn toward the receiving end of the conveyor so as to accommodate the arc of travel of the scraper arm and also irregularities or variations on the floor surface.

I claim:

1. In a material handling apparatus, an upright supporting frame, a pair of scraper members extending from opposite sides of the frame and having their inner ends pivotally supported thereon, scrapers connected to the lower ends of said members, a pair of control members each pivotally supported adjacent its inner end on the frame and extending upwardly therefrom and hingedly connected at its outer end to a scraper member intermediate the ends of the latter, and mechanism for relatively moving the inner ends of said scraper members and control members in a vertical direction to spread said scraper members and to draw the same inwardly toward the frame.

2. In a material handling apparatus, an upright supporting frame, a pair of scraper members extending from opposite sides of the frame and having their inner ends pivotally supported thereon, scrapers connected to the lower ends of said members, a pair of control members each pivotally supported adjacent its inner end on the frame and extending upwardly therefrom and hingedly connected at its outer end to a scraper member intermediate the ends of the latter, and hydraulically actuated mechanism for relatively moving the inner ends of said scraper members and control members in a vertical direction to spread said scraper members and to draw the same inwardly toward the frame.

3. In a material handling apparatus, an upright supporting frame, a pair of scraper members extending from opposite sides of the frame and having their inner ends pivotally supported thereon, a pair of control members each pivotally supported adjacent its inner end on the frame and extending upwardly therefrom and hingedly connected at its outer end to a scraper member intermediate the ends of the latter, and mechanism operative in sequence for raising the inner ends of the scraper members to draw the outer ends thereof toward the frame and thereafter for raising the inner ends of the control members relative to the inner ends of the scraper members for spreading the scraper members.

4. In a material handling apparatus, an upright supporting frame, a pair of scraper members extending from opposite sides of the frame and having their inner ends pivotally supported thereon, scrapers connected to the outer ends of said members a pair of control members each pivotally supported adjacent its inner end on the frame and extending upwardly therefrom and hingedly connected at its outer end to a scraper member intermediate the ends of the latter, and hydraulic mechanism for raising the inner ends of the scraper members relatively to the inner ends of the control members thereby to draw the outer ends of the scraper members toward the frame.

5. In a material handling apparatus, an upright supporting frame, a pair of scraper members extending from opposite sides of the frame and having their inner ends pivotally supported thereon, a pair of control members each pivotally supported adjacent its inner end on the frame and hingedly connected at its outer end to a scraper member intermediate the ends of the latter, and hydraulic mechanism for raising the inner ends of the scraper members relatively to the inner ends of the control members thereby to draw the outer ends of the scraper members toward the frame, said mechanism also including means for raising the inner ends of the control members relatively to the inner ends of the scraper members to swing the latter outwardly of the frame.

6. In a material handling apparatus, an upright supporting frame adapted to be arranged with its lower end adjacent the receiving point of a conveyor, a swinging scraper arm, a scraper connected to the outer end thereof, means on the frame for raising the inner end of the scraper arm to draw the scraper toward said receiving point, a swinging member extending upwardly from the frame and hinged to an intermediate portion of said arm above said scraper, and means on the frame for raising the inner end of said member relatively to the inner end of the scraper arm to swing the latter away from the frame.

7. In a material handling apparatus, an upright supporting frame adapted to be arranged with its lower end adjacent the receiving point of a conveyor, a swinging scraper arm, a scraper connected to the outer end thereof, hydraulically actuated means on the frame for raising the inner end of the scraper arm to draw the scraper toward said receiving point, a swinging member hinged to an intermediate portion of said arm, and hydraulically actuated means on the frame for raising the inner end of said member relatively to the inner end of the scraper arm to swing the latter away from the frame.

8. In a material handling apparatus, an upright supporting frame adapted to be arranged with its lower end adjacent the receiving point of a conveyor, a swinging scraper arm, a scraper connected to the outer end thereof for pivotal motion, means on the frame for raising the inner end of the scraper arm to draw the scraper toward said receiving point, a swinging member extending upwardly from the frame and hinged to an intermediate portion of said arm above said scraper, and means on the frame for raising the inner end of said member relatively to the inner end of the scraper arm to swing the latter away from the frame.

9. In a material handling apparatus, an upright frame, a pair of vertically spaced devices guided on said frame for up and down travel, a scraper carrying arm pivotally connected to the upper device, a scraper connected to the lower end of said arm, means for shifting the upper device upwardly on the frame, a swinging member extending upwardly from the frame and pivotally connected to the scraper arm intermediate its ends above said scraper and also pivotally connected to the lower device, and means for shifting the lower device upwardly relatively to the upper device to cause said member to swing the scraper arm.

10. In a material handling apparatus, an upright frame, a pair of vertically spaced devices guided on said frame for up and down travel, a scraper carrying arm pivotally connected to the upper device, a scraper connected to the lower end of said arm, means for shifting the upper device upwardly on the frame to draw the scraper arm toward the frame, a swinging member extending upwardly from the frame and pivotally connected to the scraper arm intermediate its ends above said scraper and also pivotally connected to the lower device, and means for shifting the lower device upwardly relatively to the upper device to cause said member to swing the scraper arm away from the frame.

11. In a material handling apparatus, an upright frame structure, a pair of scraper carrying arms pivoted adjacent their upper ends to said structure and extending outwardly therefrom at opposite sides of said structure, a pair of struts extending upwardly and outwardly from the frame structure and pivoted adjacent their inner ends to said structure and each pivoted adjacent its outer end to a scraper arm intermediate the ends thereof, a scraper supported at the lower end of each arm, and means for swinging said arms and struts inwardly toward said structure.

12. In a material handling apparatus, an upright frame structure, a pair of scraper carrying arms pivoted adjacent their upper ends to said structure and extending outwardly therefrom at opposite sides of said structure, a pair of struts extending upwardly and outwardly from the frame structure and pivoted adjacent their inner ends to said structure and each pivoted adjacent its outer end to a scraper arm intermediate the ends thereof, a scraper supported at the lower end of each arm, and means connected to the upper ends of the scraper arms for swinging the same inwardly to dispose the arms and struts alongside said structure.

13. In a material handling apparatus, an upright frame structure, scraper mechanism carried thereby including a scraper device or devices and means on said structure operative to draw the same inwardly toward the lower end of said structure to move material thereto, and means for adjusting said mechanism vertically relative to the frame structure and into different vertically spaced positions on said structure for causing operation of the scrapers at different levels relatively to the lower end of said structure.

14. In a material handling apparatus, an upright frame structure, scraper devices, mechanism on said structure for supporting said devices, means on said structure for moving the scraper devices relatively to said structure toward a conveyor receiving point at the lower end of said structure, and means for supporting said mechanism at different vertically spaced positions on said structure for causing operation of said scraper devices at different heights relative to said receiving point.

15. In a material handling apparatus, an upright frame structure, scraper devices, mechanism on said structure for supporting said devices, hydraulically operated means for moving the scraper devices toward a conveyor receiving point at the lower end of said structure, means for supporting said mechanism at different vertically spaced positions on said structure for operation at different heights relative to said receiving point, and means permitting operation of said hydraulically operated means at said different heights.

16. In a material handling apparatus, an upright frame structure, a pair of scraper carrying arms pivotally connected to said structure and extending outwardly from two sides thereof, a scraper supported by each arm, hydraulic mechanism on the structure for swinging the arms with said scrapers inwardly to a conveyor receiving point adjacent the lower end of said structure, means for supporting said mechanism at different elevations on said structure, and means on said structure for automatically controlling the operation of said mechanism at any of said elevations.

17. In a material handling apparatus, an upright frame structure, a pair of scraper carrying arms pivotally connected to said structure and extending outwardly from two sides thereof, a scraper supported by each arm, means for shifting said scrapers toward and from a conveyor receiving point adjacent the lower end of the structure, and means for supporting said arms at different levels on said structure to permit operation of the scrapers at different elevations relatively to the lower end of said structure.

18. In a material handling apparatus, an upright frame structure, a pair of scraper carrying arms pivotally connected to said structure and extending outwardly from two sides thereof, a scraper supported by each arm, means for shifting said scrapers toward and from a conveyor receiving point adjacent the lower end of the structure, and means for positioning said arms at vertically spaced positions on said structure to cause the scraper shifting means to move the scrapers in vertically spaced paths relatively to the lower end of said structure.

19. In a material handling apparatus, an upright supporting structure, a scraper device, means for supporting said device, means for adjustably mounting said supporting means at different elevations on said structure, and means operative at any of said elevations for moving said scrapers toward and from the lower end of said structure.

20. In a material handling apparatus, an upright supporting structure, a scraper device, means for supporting said device, means for adjustably mounting said supporting means at different elevations on said structure, and hydraulically operated means operative at any of said elevations for moving said scrapers toward and from the lower end of said structure.

21. In a material handling apparatus, an upright supporting structure, an upper cross-head guided for vertical movement on said structure, a lower cross-head guided for vertical movement on said structure, a pair of scraper devices, supporting members for each device pivoted respectively to said cross-heads, hydraulic mechanism for imparting a predetermined range of vertical travel to said cross-heads to operate said scraper devices, and means for adjusting vertically the positions of said cross-heads on said supporting structure at the lower limits of their range of travel.

22. In a material handling apparatus, an upright supporting structure, an upper cross-head guided for vertical movement on said structure, a lower cross-head guided for vertical movement on said structure, a pair of scraper devices, supporting members for each device pivoted respectively to said cross-heads, hydraulic mechanism connecting said cross-heads for imparting a predetermined range of vertical travel to said cross-heads to operate said scraper devices, and means for adjusting vertically the positions of said cross-heads on said supporting structure at the lower limits of their range of travel.

23. In a material handling apparatus, an upright supporting structure, an upper cross-head guided for vertical movement on said structure, a lower cross-head guided for vertical movement on said structure, a pair of scraper devices, supporting members for each device pivoted respectively to said cross-heads, hydraulic mechanism for shifting one cross-head relatively to the other in a vertical direction to operate said scraper devices, said cross-heads having a range of vertical travel between predetermined limits, and means for simultaneously varying said limits to permit operation of said scraper devices at different levels with respect to said structure.

24. In a material handling apparatus, a supporting structure, a scraper arm having a scraper device at the outer end thereof, a carrier guided for up and down travel on said structure, means connecting the inner end of said scraper arm to the carrier, means for shifting said carrier upwardly on said structure to move said scraper arm toward said structure, brake means controlled by the movement of the scraper arm for holding said carrier in predetermined elevated position on said structure, and means for shifting said scraper arm outwardly with respect to said structure.

25. In a material handling apparatus, a supporting structure, a scraper arm having a scraper device at the outer end thereof, a carrier guided for up and down travel on said structure, means connecting the inner end of said scraper arm to the carrier, means for shifting said carrier upwardly on said structure to move said scraper arm toward said structure, means for moving said scraper arm outwardly and away from said structure, brake means for holding said carrier in elevated position during said last mentioned movement of the scraper arm, and means controlled by the movement of the scraper arm for releasing said brake means.

26. In a material handling apparatus, a supporting structure, a scraper arm having a scraper device at the outer end thereof, a carrier guided for up and down travel on said structure, means connecting the inner end of said scraper arm to the carrier, means for shifting said carrier upwardly on said structure to move said scraper arm toward said structure, brake means for holding said carrier in predetermined elevated position on said structure, means for shifting said scraper arm outwardly with respect to said structure, and means controlled by said scraper arm for releasing said brake means when the arm reaches a predetermined position outwardly of the supporting structure.

27. In a material handling apparatus, a supporting structure, a scraper arm having a scraper device at the outer end thereof, a carrier guided for up and down travel on said structure, means connecting the inner end of said scraper arm to the carrier, means for shifting said carrier upwardly on said structure to move said scraper arm toward said structure, means for moving said scraper arm outwardly and away from said structure, brake means for holding said carrier in elevated position during said last mentioned movement of the scraper arm, and means controlled by the outward movement of said arm for releasing said brake means.

28. In a material handling apparatus, an upright frame structure, a carrier guided for up and down travel on said structure, a scraper arm pivotally connected adjacent its upper end to said carrier, means for shifting said carrier upwardly to swing the scraper arm toward said structure, means including a strut pivoted to the scraper arm at an intermediate point for swinging said arm outwardly with respect to said structure, and means for holding said carrier in elevated position during said last mentioned swinging movement of the scraper arm.

29. In a material handling apparatus, an upright frame structure, a carrier guided for up and down travel on said structure, a scraper arm pivotally connected adjacent its upper end to said carrier, means for shifting said carrier upwardly to swing the scraper arm toward said structure, means for swinging said arm outwardly with respect to said structure, and means controlled by said scraper arm for holding said carrier in elevated position during said last mentioned swinging movement of the scraper arm.

30. In a material handling apparatus, an upright frame structure, a carrier guided for up and down travel on said structure, a scraper arm pivotally connected adjacent its upper end to said carrier, means for shifting said carrier upwardly to swing the scraper arm toward said structure, means for swinging said arm outwardly with respect to said structure, means for holding said carrier in elevated position during said last mentioned swinging movement of the scraper arm, and means controlled by the movement of said scraper arm for releasing said holding means.

31. In a material handling apparatus, an upright frame structure, a carrier guided for up and down travel on said structure, a scraper arm pivotally connected adjacent its upper end to said carrier, means for shifting said carrier upwardly to swing the scraper arm toward said structure, means for swinging said arm outwardly with respect to said structure, hydraulic brake means operative to hold said carrier in elevated position during said outward movement of the scraper arm, and means actuated by the scraper arm upon reaching a predetermined angular position for releasing said brake means.

32. In a material handling apparatus, an upright frame structure, a carrier guided for up and down travel on said structure, a scraper arm pivotally connected adjacent its upper end to said carrier, means for shifting said carrier upwardly to swing the scraper arm toward said structure, means for swinging said arm outwardly with respect to said structure, hydraulic brake means operative to hold said carrier in elevated position during said outward movement of the scraper arm, a valve means controlled by the scraper arm for releasing said brake means to permit descent of the carrier on said frame structure at a predetermined controlled rate of travel.

33. In a material handling apparatus, an upright frame structure, a carrier guided for up and down travel on said structure, a scraper arm pivotally connected adjacent its upper end to said carrier, means for shifting said carrier upwardly to swing the scraper arm toward said structure, means for swinging said arm outwardly with respect to said structure, means for holding said carrier in elevated position during said last mentioned swinging movement of the scraper arm, and means for partially releasing said holding means to permit descent of the carrier on said frame structure at a predetermined controlled rate of travel.

34. In a material handling apparatus, an upright frame structure, scraper mechanism carried thereby including a scraper device or devices and means operative to draw the same inwardly toward a conveyor receiving point at the lower end of said structure to move material thereto, means for raising and lowering said mechanism relatively to said structure, and means for positioning and locking said mechanism in different vertically spaced positions on said structure for causing operation of the scrapers at different levels with respect to said lower end.

GEORGE B. PALMER.

REFERENCES CITED

The following references are of record in the file of this patent:

UNITED STATES PATENTS

| Number | Name | Date |
|---|---|---|
| 2,110,737 | Palmer | Mar. 8, 1938 |
| 2,348,741 | Jessen | May 16, 1944 |
| 2,177,196 | Williams | Oct. 24, 1939 |
| 1,851,923 | McQuigg | Mar. 29, 1932 |
| 1,633,627 | First | June 28, 1927 |
| 1,441,249 | Smith | Jan. 9, 1923 |
| 2,355,213 | Flanagan | Aug. 8, 1944 |
| 2,025,340 | Crocker | Dec. 24, 1935 |

FOREIGN PATENTS

| Number | Country | Date |
|---|---|---|
| 332,504 | Germany | Jan. 31, 1921 |